US010120506B2

(12) United States Patent
Chen et al.

(10) Patent No.: US 10,120,506 B2
(45) Date of Patent: Nov. 6, 2018

(54) MULTI-TOUCH CAPACITIVE SENSING SURFACE

(71) Applicant: Microsoft Technology Licensing, LLC., Redmond, WA (US)

(72) Inventors: Li-Wen (Magnetro) Chen, Beijing (CN); Feng-Hsiung Hsu, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 14/078,383

(22) Filed: Nov. 12, 2013

(65) Prior Publication Data

US 2015/0130742 A1 May 14, 2015

(51) Int. Cl.
G06F 3/041 (2006.01)
G06F 3/044 (2006.01)

(52) U.S. Cl.
CPC ............ G06F 3/044 (2013.01); G06F 3/0414 (2013.01); G06F 3/0416 (2013.01); *G06F 2203/04102* (2013.01); *G06F 2203/04111* (2013.01)

(58) Field of Classification Search
CPC ................................ G06F 3/041; G06F 3/044
USPC ........................................ 345/156, 173–178
See application file for complete search history.

(56) References Cited

U.S. PATENT DOCUMENTS

| 6,995,752 | B2 | 2/2006 | Lu |
| 7,812,827 | B2 | 10/2010 | Hotelling et al. |
| 7,928,964 | B2* | 4/2011 | Kolmykov-Zotov ........................ G06F 3/0416 345/173 |
| 2009/0244092 | A1* | 10/2009 | Hotelling ...................... 345/619 |
| 2011/0102331 | A1* | 5/2011 | Philipp ........................ 345/173 |
| 2011/0148811 | A1* | 6/2011 | Kanehira et al. ............. 345/174 |
| 2012/0038583 | A1* | 2/2012 | Westhues et al. ............ 345/174 |
| 2012/0244910 | A1 | 9/2012 | Hsu |
| 2012/0268420 | A1 | 10/2012 | Marhefka et al. |
| 2013/0093500 | A1 | 4/2013 | Bruwer |
| 2013/0176268 | A1* | 7/2013 | Li .......................... G06F 3/044 345/174 |
| 2013/0222286 | A1* | 8/2013 | Kang ...................... G06F 3/041 345/173 |

OTHER PUBLICATIONS

"International Search Report and Written Opinion Issued in PCT Application No. PCT/US2014/063616", dated Jan. 30, 2015, 10 Pages.

(Continued)

*Primary Examiner* — Ram A Mistry

(57) ABSTRACT

Disclosed are techniques and systems for distinguishing between inadvertent contact and an intentional key press on a touch-sensitive input device, such as a keyboard or other like peripheral. In some embodiments, a system may include a first electrode disposed in a first plane, and a second electrode disposed in a second plane substantially parallel to the first plane. The system may also include one of a flexible dielectric material and an air gap spacing the first electrode from the second electrode; and a third electrode disposed in a third plane substantially parallel to the first plane. The third electrode may extend substantially parallel to the first electrode, and may be spaced from the first electrode by the one of the flexible dielectric material and the air gap.

20 Claims, 7 Drawing Sheets

(56) References Cited

OTHER PUBLICATIONS

Lin, et al., "3D Stylus and Pressure Sensing System for Capacitive Touch Panel", In IEEE International Conference on Consumer Electronics, Jan. 13, 2012, 2 pages.
Rosenberg, et al., "The UnMousePad—An Interpolating Multi-Touch Force-Sensing Input Pad", In ACM Transactions on Graphics, vol. 28, Issue 3, Aug. 2009, 10 pages.
Walker, Geoff, "A Review of Technologies for Sensing Contact Location on the Surface of a Display", In Journal of the Society for Information Display, vol. 20, Issue 8, Aug. 2012, 28 pages.
Office action for U.S. Appl. No. 14/078,383, dated Apr. 15, 2015, Chen et al., "Multi-Touch Capacitive Sensing Surface," 10 pages.
"Second Written Opinion Issued in PCT Application No. PCT/US2014/063616," dated Sep. 29, 2015, 4 Pages.
"International Preliminary Report on Patentability Issued in PCT Application No. PCT/US2014/063616", dated Feb. 4, 2016, 6 Pages.

\* cited by examiner

MULTI-TOUCH CAPACITIVE SENSING SURFACE

BACKGROUND

Conventional thin keyboard technologies that omit mechanically moveable keys fail to provide satisfactory typing efficiencies and user experience. Common touch-sensitive keyboards utilize a number of electrodes oriented in the form of a grid. Typically, a first layer of parallel electrodes is driven with a constant electrical charge, while a second layer of parallel electrodes, oriented perpendicular to the first layer, is configured to receive a portion of the electrical charge. When a conductor (e.g. a user's finger) approaches the keyboard, the electrical field created between the layers of electrodes is affected, thereby causing a change in the amount of electrical charge received by the second layer. Known touch-sensitive keyboards determine the location at which the conductor contacts the keyboard (e.g., a touch point) as a result of the change in the amount of electrical charge, and interprets the press of a corresponding key based on the determined location.

While known touch-sensitive keyboards are capable of determining such touch point information, current keyboard designs are not capable of measuring additional parameters, such as a pressure applied to the keyboard by the conductor, without the use of additional sensing technology. A user who is typing on a conventional touch-sensitive keyboard often rests his or her hand on a portion of the keyboard, which causes an unintentional input to be received by the conventional touch-sensitive keyboard. In order to distinguish between an intentional key press by the user, and unintentional contact between the keyboard and the user's hand, current keyboards utilizing resistive-type touch technology may employ a layer of force-sensitive resistors (FSRs) to measure user interaction with the keyboard at various locations. Unfortunately, however, current keyboards utilizing resistive-type touch technology, FSRs, are unable to represent "pressure" information to distinguish between an intentional key press by the user, and unintentional contact between the keyboard and the user's hand. Moreover, FSRs are relatively expensive components, and the use of such FSRs can significantly increase the overall cost of the keyboard. It can also be difficult to manufacture current touch-sensitive keyboards in a way that enables satisfactory correlation between the location of a particular FSR and a location of one or more corresponding electrodes.

SUMMARY

This disclosure describes, in part, techniques and systems for distinguishing between an intentional key press on a touch-sensitive input device, such as keyboard, touchpad, touch screen, or other like peripheral, and an inadvertent or unintentional touch contact by a user of the device. In some embodiments, techniques described herein may determine a location on a surface of the device at which the contact occurs. Additionally, such techniques may determine a pressure associated with the contact, and the techniques may characterize the contact as either intentional or inadvertent based on the determined location and/or pressure. For example, the techniques may characterize the contact based on a capacitance associated with the contact. By characterizing contact in this way, the systems and devices described herein may avoid performance of unintentional actions. In addition, the devices descried herein may be configured to determine pressure and/or other characteristics associated with such contact without employing FSRs or other like components. As a result, cost may be reduced and the difficulty associated with manufacturing such devices may be minimized.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Embodiments of the present disclosure are directed to, among other things, techniques and systems for obtaining user input, at least a portion of which may be received from a keyboard, to improve typing efficiencies and user experience. Embodiments described herein may be applied to keyboards, or similar human interface devices (HIDs), that may contain one or more keys or buttons. Keyboards, as used herein, may be physical keyboards (i.e., made of a tangible material with a physical structure) integrated with, or used as a peripheral device to, computing devices. Physical keyboards may be of any structure with structure and thickness ranging from a sheet of paper to a keyboard with mechanically movable key-switch structures. For example, keyboards used with slate or tablet computers (e.g., the Touch Cover™ used with the Surface™ tablet manufactured by Microsoft® Corporation of Redmond, Wash.), notebooks or laptop computers, and the like, are contemplated for use with the embodiments of the present disclosure. However, it is to be appreciated that the disclosed embodiments may also be utilized with other similar types of HIDs (i.e., HIDs having multiple keys), pointing devices with keys or buttons, joysticks, remote control input devices for television or similar devices, gaming system controllers, mobile phones keyboards, automotive user input mechanisms, home automation (e.g., keyboards embedded in furniture, walls, etc.), and the like. The term "external keyboard" is sometimes used herein to denote any keyboard, including those listed above, that may be removably coupled to (via a wired or wireless connection) an associated computing device. Any keyboard that is "external" to an associated computing device in the sense that it is not an on-screen, soft keyboard that displays a keyboard GUI on an output display screen of a computing device, is contemplated for use with the embodiments disclosed herein, whether it be a physical or virtual keyboard.

The techniques and systems disclosed herein utilize an advanced touch-sensitive surface configuration to receive and process information that may be leveraged by multiple different user processes. The devices of the present disclosure may utilize the information received via the touch-sensitive surface in a variety of ways. For example, a processor and/or a classification module of the device may classify the information as an intended input or an unintentional input. The processor may control the device to produce an output corresponding to the intended input, such as a text-based output (e.g., character or word output). The processor may also control the device to avoid action associated with the unintentional input, which may enhance the user's experience.

The techniques and systems described herein may be implemented in a number of ways. Example implementations are provided below with reference to the following figures.

Example Computing System

Figure 1:
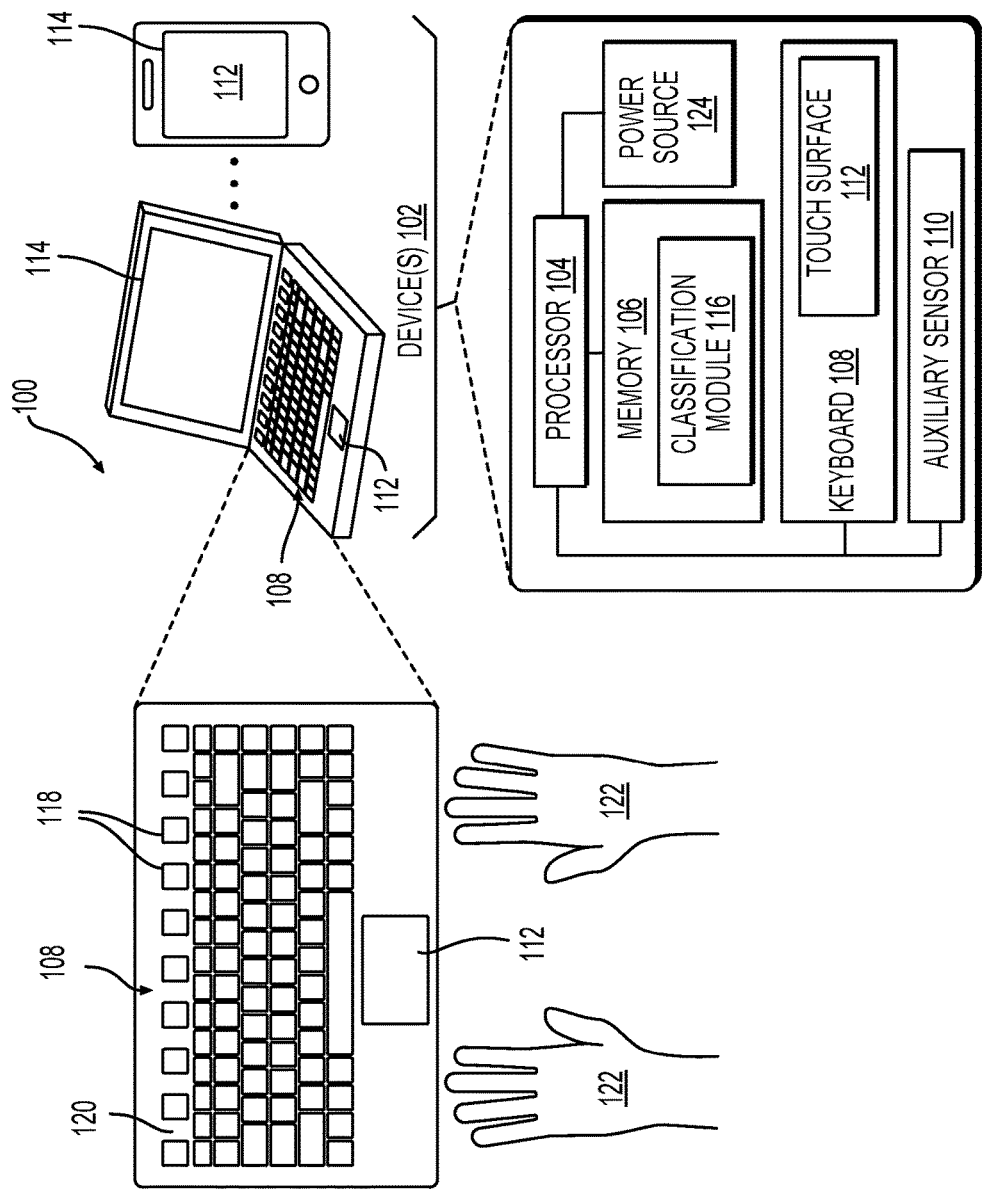
FIG. 1 illustrates an example architecture including a computing device configured with a multi-touch capacitive sensing surface to receive user input.

FIG. 1 illustrates an example architecture 100 including a computing device 102 that is configured to receive information in the form of user input from one or more touch-sensitive input devices associated with the computing device 102. For example, the computing device 102 may be a tablet or notebook computer configured to accept information from a touch-sensitive surface of a keyboard, touchpad, touchscreen, or other like peripheral device. In some embodiments, the device 102 may be configured to identify inadvertent user input (e.g., touch contact, air input, etc.) with the surface and avoid performing operations associated with such input. For example, the device 102 may evaluate contextual information, such as a pressure applied to the surface by the user when the user's hand contacts the device 102. The device 102 may also evaluate additional information, such as a location of such contact, and may classify the contact as intentional or unintentional based on the received information. When the contact is classified as intentional, the device 102 may perform an action that is associated with the contact, such as outputting a desired letter, number, or symbol associated with a corresponding key, selecting an interface element, moving a mouse pointer or cursor, scrolling on a page, and so on. In contrast, when the contact is classified as unintentional, the associated action may not be performed.

The device 102 may represent a laptop computer, a desktop computer, a smart phone, an electronic reader device, a mobile handset, a personal digital assistant (PDA), a portable navigation device, a portable gaming device, a game console, a tablet computer, a watch, a portable media player, and so on. In some instances, the device 102 may comprise a mobile device, while in other instances the device 102 may comprise a stationary device.

The device 102 may be equipped with one or more processor 104, memory 106, keyboard(s) 108, auxiliary sensor(s) 110, touch surface 112, and/or display 114. In some embodiments, a touch surface 112 of the device 102 may provide a soft keyboard 108. Although not illustrated in FIG. 1, the device 102 may also include or be associated with one or more network interfaces, other input and/or output peripheral devices (e.g., a mouse, a non-integrated keyboard, a joystick, a microphone, a camera, a speaker, a printer, etc.), and/or other elements typically associated with a computing device. Some or all of the above components of the device 102, whether illustrated or not illustrated, may be in communication with each other and/or otherwise connected via one or more buses or other known means. Such connections are illustrated schematically in FIG. 1.

The one or more processors 104 may include a central processing unit (CPU), a graphics processing unit (GPU), a microprocessor, and so on. Alternatively, or in addition, the processor 104 may include one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. The processor 104 may be operably connected to and/or otherwise in communication with the memory 106 and/or other components of the device 102 described herein. In some embodiments, the processor 104 may also include on-board memory configured to store information associated with various operations and/or functionality of the processor 104.

The memory 106 may include one or a combination of computer readable media operably connected to the processor 104. Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The device 102 may communicate with one or more like devices, servers, service providers, or other like components via one or more networks (not shown). The one or more networks may include any one or combination of multiple different types of networks, such as cellular networks, wireless networks, Local Area Networks (LANs), Wide Area Networks (WANs), Personal Area Networks (PANs), and the Internet. Additionally, the service provider may provide one or more services to the device 102. The service provider may include one or more computing devices, such as one or more desktop computers, laptop computers, servers, and the like. The one or more computing devices may be configured in a cluster, data center, cloud computing environment, or a combination thereof. In one example, the one or more computing devices provide cloud computing resources, including computational resources, storage resources, and the like, that operate remotely to the device 102.

The memory 106 may include software functionality configured as one or more "modules." The term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable by the processor 104, in other embodiments, any or all of the modules may be implemented in whole or in part by other hardware components of the device 102 (e.g., as an ASIC, a specialized processing unit, etc.) to execute the described functions. In some instances, the functions and/or modules are implemented as part of an operating system. In other instances, the functions and/or modules are implemented as part of a device driver (e.g., a driver for a touch surface), firmware, and so on. As illustrated in FIG. 1, the memory 106 may include a classification module 116. Although not shown in FIG. 1, in additional embodiments, the memory 106 may additionally or alternatively include a learning module and/or one or more additional modules. Although in the architecture 100 of FIG. 1 the classification module 116 is illustrated as being included in the device 102, alternatively, the classification module 116, a learning module, and/or other modules associated with the device 102 may be included in the service provider or network described above. As such, in some instances the device 102 may act as an input/output device that receives user input and outputs content, while the service provider performs functions for classifying user input, learning information, and other operations.

The classification module 116 may classify user input (e.g., touch contacts, air input, etc.) received through the device 102 (e.g., via the keyboard 108 and/or the touch surface 112). The classification may be based on contextual information and/or other types of information. For example, the classification may be based on location information associated with a location on the keyboard 108 at which the contact occurs. In additional examples, the classification may be based on such location information and/or pressure information associated with the contact. For example, the classification may be based, at least in part, on a determined pressure applied to the keyboard 108 by the user in contacting the keyboard 108. Such classifications may be saved in the memory 106 and/or provided to the processor 104 by the communication module 116 for use in further operations of the device 102.

In some embodiments, a learning module (not shown) may learn information related to a user's interaction with the device 102. For example, a learning module may learn an average typing rate of the user (e.g., a number of key strokes per unit of time), characteristics about the user's hands (e.g., a size of the tips of the user's fingers, a palm size, etc.), how often after typing the user uses the touch surface 112, and so on. This information may be utilized to create a personalized user experience and/or profile for the touch surface 112 and/or other input devices. Such personalized user experiences and/or profiles may be saved in the memory 106 and/or provided to the processor 104 for use in further operations of the device 102.

In some embodiments, some portions of the keyboard 108 may be associated with a higher degree of intentional contact in comparison to other portions of the keyboard 108. For example, the keyboard 108 may include a set of mechanical or pressure-sensitive buttons, while in other instances the keyboard 108 may be implemented through a touch screen or other type of touch surfaces 112 described herein. The buttons of the keyboard 108 may include alpha-numerical keys (e.g., letters or numbers), control keys (e.g., shift, enter, F1-F12, esc, etc.), or any other type of key 118. Such keys 118 may be disposed on, embedded substantially within, and/or formed by an outer surface 120 of the keyboard 108. The keyboard 108 of FIG. 1 illustrates one example layout, but it is to be appreciated that the embodiments described herein are not limited to any particular keyboard layout such that keyboards with any number of keys 118 in any arrangement or layout may be utilized without changing the basic characteristics of the device 102. The keys 118 may be actuating, or non-actuating, physical, or virtual, and each key 118 may be appropriately labeled to identify a particular key with one or more characters, such as letters, numbers, symbols, etc. The keys 118 may generally register a specific character, symbol, or function upon activation of the keys 118 which may be determined from a detected input event, as described below.

In some embodiments, the outer surface 120 of the keyboard 108 may include the touch surface 112. In such embodiments, if contextual information, namely location and/or pressure information indicative of a touch contact, indicates that a user's hand 122 contacts the outer surface 120 at locations outside of and/or not associated with one or more of the keys 118 and/or the touch surface 112, the classification module 116 may classify the touch contact as inadvertent. On the other hand, if such information indicates that the user's finger and/or other portions of the user's hand 122 contact one or more of the keys 118 and/or the touch surface 112, the classification module 116 may classify the touch contact as intentional. Other examples of classifying touch contact will be discussed below.

The auxiliary sensor 110 may represent a proximity sensor that detects a proximity of objects to the device 102 (e.g., a sensor that detects a user gripping the device 102, etc.), a presence sensor, an infrared (IR)/thermal sensor, a Wi-Fi® sensor, a camera, a microphone, and so on. In some instances, the camera and/or microphone may act to detect proximity of an object to the device 102 (e.g., by analyzing video or audio of objects that are in proximity to the device). Although many of the example techniques herein discuss user input as corresponding to a touch contact, the techniques may similarly apply to other types of user input, such as air input. As used herein, "air input" may refer to any type of input that is received without contacting the outer surface 120 (e.g., through the air). In one instance, air input comprises an air gesture, such as a user waving a hand to initiate an action, a user holding a hand in a particular orientation or manner (e.g., making a fist or thumbs-up), or any other type of bodily action or positioning. As such, in some instances the auxiliary sensor 110 of the device 102 may include cameras, temperature sensors, proximity sensors, IR sensors, microphones, or other devices to detect air input.

The touch surface 112 may comprise any type of digitizer configured to detect a touch contact. The detection may be based on capacitive, optical, or any other sensing technique. In one example, the touch surface 112 includes a touch pad (also known as a track pad) having a tactile sensor to sense touch, pressure, and/or force (of an area of contact). Alternatively, or additionally, the touch surface 112 may include a touch screen. In some instances, the touch surface 112 may be implemented as a device that includes a touch pad and a mouse (e.g., a combination touch pad-mouse device external to or integrated with the device 102). Further, in some instances the touch surface 112 may be implemented as a touch screen display configured to display content, while the touch pad may not be configured to display content.

The device 102 may be operably connected to a power source 124. In some embodiments, the power source 124 may comprise a rechargeable battery removably connected to the device 102. In such embodiments, the power source 124 may be disposed substantially within a portion of the device 102, and may be removed or replaced as needed. Alternatively, the power source 124 may comprise a wall outlet or other like source of external DC power connectable to the device 102. The power source 124 may be operably connected to the processor 104, the keyboard 108, the auxiliary sensor 110, and/or other components of the device 102, and may be configured to provide electrical power to such components during operation of the device 102. The device 102 and/or the power source 124 may include one or more drivers, transformers, power circuits, converters, regulators, and/or other like components (not shown) configured to condition the electrical power provided by the power source 124 as necessary.

Example Device

Figure 2:
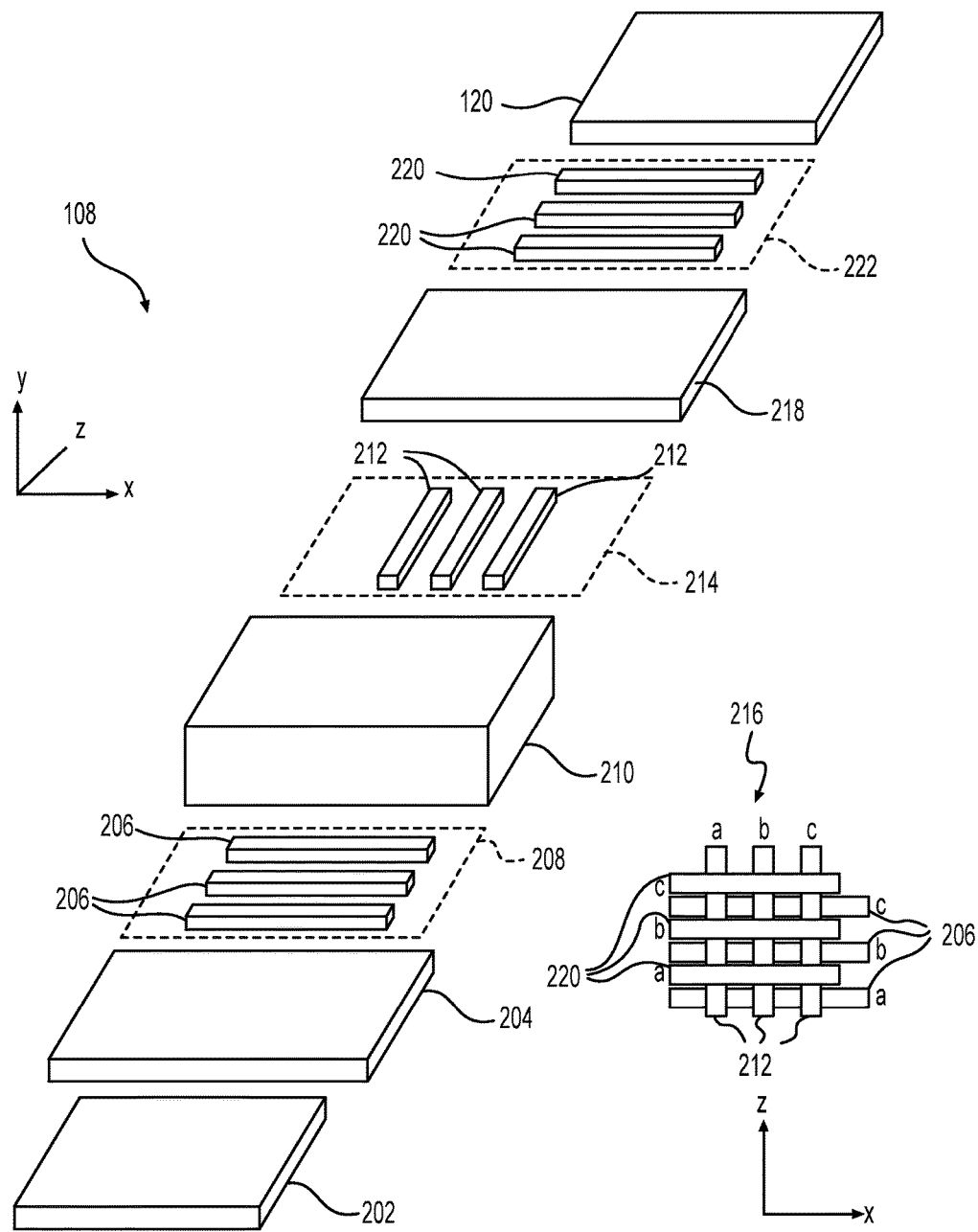
FIG. 2 illustrates an example of a structure of an associated computing device with a multi-touch capacitive sensing surface.
Figure 3:
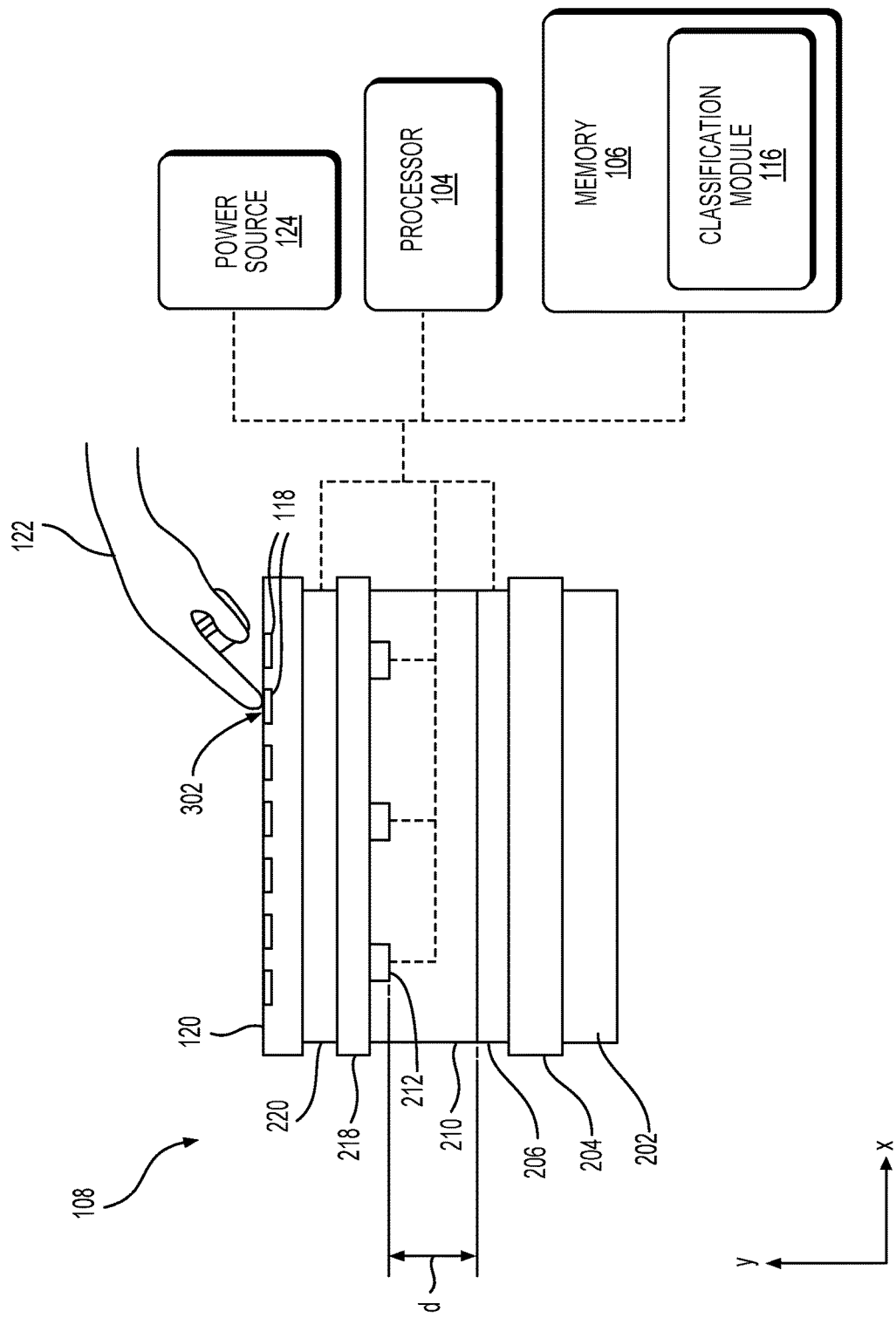
FIG. 3 is a further illustration of the structure shown in FIG. 2.

FIGS. 2 and 3 illustrate example structural details of the device 102 of FIG. 1 having a multi-touch capacitive sensing surface. In particular, FIG. 2 illustrates a partial exploded view of a keyboard 108 associated with the device 102. FIG. 3 illustrates a side view of the keyboard 108 shown in FIG. 2. As noted above, the keyboard 108 is one example of an input device including a multi-touch capacitive sensing surface, and other input devices including a multi-touch capacitive sensing surface as described herein may include pressure sensitive touch input devices such as pressure sensitive touch surfaces 112, which can include touch pads and/or touch screens, etc. The keyboard 108 may be either embedded within the computing device 102, or removably coupled to the computing device 102 as with an external keyboard. For example, the keyboard 108 may be physically connected to the computing device 102 through electrical couplings such as wires, pins, connectors, etc., or the keyboard 108 may be wirelessly coupled to the computing device, such as via short-wave radio frequency (e.g., Bluetooth®), or another suitable wireless communication protocol.

As shown in FIGS. 2 and 3, the keyboard 108 and/or other touch input device such as touch surface 112, may include a plurality of components configured to determine a capacitance or a change in capacitance, and together such components may comprise a multi-touch capacitive sensing surface, device, and/or component of the keyboard 108 and/or touch surface 112. In particular, such components may be referred to as "stack-up" configurations configured to provide and/or otherwise determine the location of multiple touch and/or air contacts with the outer surface 120 using various capacitive sensing techniques. In such embodiments, the stack-up configurations described herein may also be configured to determine a pressure associated with such contact, such as, for example, a pressure applied by the user at the determined contact location. The components, e.g., keyboard components and/or touch surface components, of the present disclosure may be operably connected to, for example, the processor 104, the memory 106, the power source 124, and/or other components of the device 102, and such components may be configured to provide information in the form of electrical signals to such device components for processing.

As shown in FIGS. 2 and 3, the keyboard 108 and/or touch surface 112 may include a base layer comprising a ground mesh or shield 202. In some embodiments, the ground shield 202 may be mounted to, embedded within, and/or otherwise substantially contained within an outer housing (not shown) of the keyboard 108 and/or other touch input device such as touch surface 112. Alternatively, the ground shield 202 may comprise an outer bottom surface of the keyboard 108 and/or other touch input device. In some embodiments, the ground shield 202 may comprise a support layer configured to substantially eliminate electrical interference from the surrounding environment. For example, in applications in which the keyboard 108 and/or other touch input device is disposed and/or otherwise used on a surface having an uneven or nonuniform dielectric constant, the ground shield 202 may be configured to reduce and/or substantially eliminate electrical interference caused by such materials being disposed within relatively close proximity of the capacitive sensing components of the keyboard 108 and/or the other touch input device. In some embodiments, the ground shield 202 may be made from any material having a relatively low dielectric constant, and such materials may include, for example, silicone, polymers, or other like materials. Such materials may have a dielectric constant between, for example, approximately 1 and approximately 5. Alternatively, in additional embodiments the ground shield 202 may be omitted.

An electrode support substrate 204 may be disposed on and/or otherwise operably connected to the ground shield 202. Such a substrate 204 may provide a substantially rigid base onto which one or more electrodes 206 may be disposed. In some embodiments, the substrate 204 may be substantially planar or, alternatively, may have any slight curvature configured to provide ergonomic advantages to the keyboard 108. For example, the substrate 204, or portions thereof, may be substantially convex to provide a more comfortable typing experience for the user. The substrate 204 may be made from one or more of the materials described above with respect to the ground shield 202. For example, the substrate 204 may be made from one or more polymers having a relatively low dielectric constant. Accordingly, in addition to providing support for the electrodes 206 described above, the substrate 204 may further assist in reducing and/or substantially eliminating electrical interference caused by materials having an uneven or non-uniform dielectric constant being disposed in close proximity to the electrodes 206 and/or other capacitance sensing components of the keyboard 108 and/or the other touch input device.

The electrodes 206 may comprise a plurality of first electrodes employed by the keyboard 108 and/or the other touch input device for determining capacitance, relative capacitance, and/or other characteristics of an electrical field formed during use of the keyboard 108 and/or the other touch input device. In some embodiments, the various electrodes described herein may comprise one or more capacitance sensors configured to measure a change in capacitance when positioned proximate a conductor. Such electrodes may comprise any type of sensor configured to detect the presence of a conductor, (e.g. a finger of the user's hand 122) or other item having a dielectric constant different than that of air. In some embodiments, the electrodes 206 may include a first conductive layer made from copper, indium tin oxide, silver, carbon, printed ink, and/or any other known conductive material. During use, a voltage may be applied to the conductive layer, resulting in the formation of an electric field extending from the conductive layer. When a conductor is disposed within the electric field, a capacitor is formed, and the electrodes 206 may measure a change in capacitance resulting from the conductor's presence within the electric field. For example, the capacitance may change as the distance between the conductive layer of the electrodes 206 and the conductor changes. The electrodes 206 may be configured to generate one or more signals indicative of such a capacitance and/or a change in capacitance, and the change in capacitance may be based on the distance between the electrodes 206 and the conductor. Such signals may be sent by the electrodes 206, for example, to the processor 104 and/or the memory 106 for analysis. Various algorithms may be utilized by the processor 104 to determine such a capacitance or change in capacitance based on these signals. It is understood that any of a variety of converters and/or other electrical components may be used with the processor 104 to condition and/or interpret the signals generated by the electrodes 206. For example, the processor 104 may include a software and/or hardware converter (not shown), and such a converter may be configured to convert the capacitive input signals generated by the electrodes 206 into digital values or "counts" representative of the measured capacitance.

In some embodiments, the electrodes 206 may be disposed in a first plane 208, and may be disposed adjacent to and/or embedded substantially within a dielectric material 210. In alternative embodiments, the dielectric material 210 illustrated in FIGS. 2 and 3 may comprise an air gap. In some embodiments of the present disclosure, the dielectric material and/or the air gap 210 may space the plurality of first electrodes 206 from a plurality of second electrodes 212. In such embodiments, the plurality of second electrodes 212 may be disposed in a second plane 214, and the second plane 214 may be substantially parallel to the first plane 208. As shown in FIGS. 2 and 3, each electrode 206 of the plurality of first electrodes may extend substantially parallel to at least one adjacent electrode 206 of the plurality of first electrodes 206. Similarly, each electrode 212 of the plurality of second electrodes 212 may extend substantially parallel to at least one adjacent electrode 212 of the plurality of second electrodes 212. Further, the plurality of first electrodes 206 may extend in a first direction, and the second plurality of electrodes 212 may extend in a second direction substantially perpendicular to the first direction. For example, as shown in FIG. 2, the electrodes 206 disposed in the first plane 208 may extend in the X direction while the electrodes 212 disposed in the second plane 214 may extend in the Z direction. The pluralities of first and second electrodes 206, 212 may be spaced from each other in the Y direction by the dielectric material and/or the air gap 210.

The dielectric material and/or the air gap 210 may be characterized by a relatively low and substantially uniform dielectric constant. For example, a dielectric material 210 suitable for use in embodiments of the present disclosure may include silicone, polymers, foams, rubber, and/or other like materials. In some embodiments, such a dielectric material 210 may comprise a silicone rubber foam having a dielectric constant of less than approximately 5. In some embodiments, the silicone rubber foam and/or other dielectric materials 210 utilized by the present design may be characterized by a dielectric constant that increases as pressure is applied thereto. Such increases in the dielectric constant may be, for example, proportional to the pressure applied and/or may be governed by other relationships, such as relationships that are substantially logarithmic, substantially exponential, or substantially stepwise in nature.

Alternatively, an air gap 210 having a dielectric constant of 1 may be utilized to space the plurality of first electrodes 206 from the plurality of second electrodes 212 in the Y direction. For example, as shown in at least FIG. 3, the dielectric material and/or air gap 210 may space the plurality of first electrodes 206 from the plurality of second electrodes 212 by any desired distance d in the Y direction. In some embodiments, the distance d may be substantially equal to a height and/or thickness of the dielectric material and/or air gap 210. Alternatively, as shown in at least FIG. 3, the distance d may be less than a corresponding height and/or thickness of the dielectric material and/or air gap 210.

As noted above, the plurality of first electrodes 206 may be disposed substantially perpendicular to the plurality of second electrodes 212, and in such a configuration, the pluralities of electrodes 206, 212 may overlap each other to form a grid 216 of capacitance sensing nodes as viewed from the Y axis. Accordingly, the pluralities of first and second electrodes 206, 212 may be configured to measure and/or otherwise determine changes in capacitance at such nodes resulting from a conductor, such as the user's hand 122, approaching the nodes. In some embodiments, the nodes formed by the pluralities of first and second electrodes 206, 212 may be configured to determine a pressure applied by fingers and/or other portions of the user's hand 122 as the hand 122 contacts the outer surface 120. Additionally, as will be described in greater detail below, one or more nodes formed by the plurality of second electrodes 212 and an additional one or more electrodes of the keyboard 108 may be configured to determine a location at which the fingers and/or other portions of the user's hand 122 contacts the outer surface 120. As a result of the above configuration, the keyboards 108 of the present disclosure may be capable of determining and/or monitoring multiple touches by the user.

In the various configurations of the keyboard 108 and/or other touch input device such as a touch surface 112, which can include a pressure sensitive touch pad and/or a touch screen, etc., set forth herein, the capacitive sensing nodes described above with respect to the grid 216 may be operable as either a self-capacitance system, a mutual-capacitance system, and/or a combination of such systems. When configured as a self-capacitance system, a capacitance associated with the nodes formed by the spatially separated electrodes described herein may be determined relative to a known or reference capacitance. For example, in embodiments in which the keyboard 108 and/or other touch input device includes the ground shield 202, the capacitance of each node may be determined relative to ground. In such embodiments, at least one of the plurality of first electrodes 206 and at least one of the plurality of second electrodes 212 may be operably connected to the power source 124 via the processor 104 and/or other components of the device 102, and may be driven by the power source 124 with a constant voltage.

As shown in FIGS. 2 and 3, the keyboard 108 and/or other touch input device such as touch surface 112 may also include a substantially planar printed circuit board 218. In some embodiments, the printed circuit board 218 may comprise any substantially flexible material, such as Kapton®, or other common circuit board materials configured for use in touch-sensitive devices. The printed circuit board 218 may function as a platform or support structure for one or more of the electrodes such as those described herein with respect to the keyboard 108 and/or other touch input devices. For example, the plurality of second electrodes 212 may be disposed on, embedded substantially within, and/or otherwise fixed to a first side of the printed circuit board 218 facing the dielectric material and/or air gap 210. The printed circuit board 218 may also include a second side opposite the first side and facing away from the dielectric material and/or air gap 210. In some embodiments, the printed circuit board 218 may be spaced from the first electrodes 206 by the dielectric material and/or the air gap 210. In such embodiments, the keyboard 108 and/or other touch input device such as touch surface 112 may also include a plurality of third electrodes 220 disposed on, embedded substantially within, and/or otherwise fixed to the second side of the printed circuit board 218. In such embodiments, the plurality of third electrodes 220 may be spaced from the plurality of second electrodes 212 by a width, thickness, and/or other portion of the printed circuit board 218. Likewise the plurality of second electrodes 212 may be disposed between the plurality of first electrodes 206 and the plurality of third electrodes 220.

At least one electrode 220 of the plurality of third electrodes 220 may be disposed in a third plane 222 substantially parallel to the first plane 208 and/or the second plane 214. In such embodiments, the third electrode 220 may extend substantially parallel to (i.e., in the direction of the X axis) at least one of the first electrodes 206 and may extend substantially perpendicular to at least one of the second electrodes 212. Additionally, as described above with respect to the plurality of first electrodes 206, each electrode 220 of the plurality of third electrodes 220 may be disposed substantially parallel to one another. Moreover, at least one of the first and second electrodes 206, 212 may be configured to determine a first characteristic associated with a conductor, such as a finger of the user's hand 122, contacting the outer surface 120 via one of a self-capacitance measurement and a mutual-capacitance measurement. In such embodiments, at least one of the second and third electrodes 212, 220 may be configured to determine a second characteristic associated with such a conductor contacting the outer surface 120 based on the other of the self-capacitance measurement and the mutual-capacitance measurement. Additionally, in some embodiments, one or more of the electrodes 206, 212, 218 described herein may be configured to operate as a proximity sensor that detects a proximity of objects to the device 102 similar to the auxiliary sensor 110 described above. Such operation of the electrodes 206, 212, 218 may be dependent upon, for example, receipt of a significant signal via one of a self-capacitance measurement and a mutual-capacitance measurement.

In some embodiments, the plurality of first electrodes 206 or the plurality of second electrodes 212 may be operably connected to the power source 124 via drive circuitry associated with the processor 104. In such embodiments, the other of the plurality of first electrodes 206 and the plurality of second electrodes 212 may be operably connected to sensing circuitry (not shown) within the processor 104 and/or the classification module 116. In such embodiments, the one or more electrodes driven by the power source 124 may comprise transmitters of the self-capacitance system while the one or more electrodes operably connected to the sensing circuitry may comprise receivers of the self-capacitance system. Such receivers of the self-capacitance system may determine the capacitance at each node (and such a determination may be made relative to ground), when a conductor approaches and/or contacts, for example, the outer surface 120.

When configured as a mutual-capacitance sensing system, on the other hand, a mutual-capacitance between, for example, an electrode 206 of the plurality of first electrodes, and an electrode 212 of the plurality of second electrodes may be determined. For example, in a mutual-capacitance sensing arrangement, a mutual-capacitance may be determined for each node formed by the crossing of the spatially separated electrodes 206, 212. In such embodiments, the plurality of first electrodes 206 or the plurality of second electrodes 212 may be operably connected to the power source 124 via drive circuitry associated with the processor 104. Likewise, as described above, the other of the plurality of first electrodes 206 and the plurality of second electrodes 212 may be operably connected to sensing circuitry (not shown) within the processor 104 and/or the classification module 116. In such embodiments, the one or more electrodes driven by the power source 124 may comprise transmitters of the mutual-capacitance system while the one or more electrodes operably connected to the sensing circuitry may comprise receivers of the mutual-capacitance system.

However, in a mutual-capacitance sensing system, the plurality of electrodes connected to the sensing circuitry may determine a mutual-capacitance, at each node, relative to the other plurality of electrodes operably connected to the power source 124 and driven by a voltage. For example, during operation a voltage may be applied to each electrode 206 of the plurality of first electrodes 206, and due to the capacitive relationship between the electrodes 206, 212 at each node, such a voltage may result in a measurable current and/or voltage in the plurality of second electrodes 212. The relationship between the voltage applied to the plurality of first electrodes 206, and the current and/or voltage appearing in the plurality of second electrodes 212 may be a function of the capacitance between the plurality of first electrodes 206 and the plurality of second electrodes 212. Further, as noted above, this determined mutual-capacitance may be affected by conductor, such as a finger and/or other portion of the user's hand 122 being disposed in close proximity to one or more of the nodes.

In some embodiments, the keyboard 120 may comprise a combined self-capacitance system and mutual-capacitance system. Such a combined system may be configured to determine various characteristics associated with the keyboard 108 and/or other touch input device such as the touch surface 112 substantially simultaneously. As used herein, the term "substantially simultaneously" may encompass precisely simultaneous as well as nearly simultaneous events. For example, substantially simultaneous events may begin at approximately the same time and may end at approximately the same time. Additionally, substantially simultaneous events may take place over at least partially overlapping time periods. For example, the first and second electrodes 206, 212 may be configured to determine a pressure applied to the outer surface 120 by the user's hand 122 via a self-capacitance measurement, and the second and third electrodes 212, 220 may be configured to determine a location 302 on the outer surface 120 at which the user's hand 122 contacts the surface 120 via a mutual-capacitance measurement. In such embodiments, the first, second, and third electrodes 206, 212, 220 may be configured to determine the respective pressure and location associated with such contact substantially simultaneously.

In additional embodiments, the first and second electrodes 206, 212 may be configured to determine a pressure, a location 302 on the surface 120, and/or other characteristics associated with a conductor contacting the surface 120 via mutual-capacitance measurements. In further embodiments, the second and third electrodes 212, 220 may be configured to determine a pressure, a location 302 on the surface 120, and/or other characteristics associated with a conductor contacting the surface 120 via self-capacitance measurements. Additionally, although the first and third electrodes 206, 220 have been described herein primarily as comprising transmitter electrodes driven by a voltage received from the power source 124, and the second electrodes 212 have been described herein primarily as comprising receiver electrodes operably connected to a sensing circuit of the processor 104 (e.g., a transmitter-receiver-transmitter "(TRT)" configuration), in alternative embodiments this configuration may be reversed. For example, in additional embodiments, the first and third electrodes 206, 220 may comprise receiver electrodes operably connected to the sensing circuit of the processor 104, and the second electrodes 212 may comprise transmitter electrodes driven by the voltage received from the power source 124 (e.g., a receiver-transmitter-receiver "(RTR)" configuration).

Moreover, although the first and second electrodes 206, 212 have been described herein as being primarily configured to determine a pressure applied to the surface 120, and the second and third electrodes 212, 220 have been described herein as being primarily configured to determine the location 302 on the surface 120 at which the contact occurs, in alternative embodiments the first and second electrodes 206, 212 may be configured to determine such a location 302, and the second and third electrodes 212, 220 may be configured to determine such a pressure. Additionally, although FIGS. 2 and 3 illustrate an embodiment in which the keyboard 108 and/or other touch input device such as touch surface 112 includes three first electrodes 206, three second electrodes 212, and three third electrodes 220, in further embodiments, the keyboard 108 and/or other touch input device such as touch surface 112 may include any number of first, second, and third electrodes 206, 212, 220, greater than or less than three. By increasing the number of electrodes 206, 212, 220 being used, the resolution and/or sensitivity of the keyboard 108 or other pressure sensitive touch surface 112 for sensing capacitance and/or other characteristics may be improved. In embodiments, the number of electrodes 206, 212, 220 utilized may be determined based on the shape, size, configuration, and/or other characteristics of the outer surface 120 and/or the touch surface 112.

As shown in FIGS. 2 and 3, the outer surface 120 may overlay the electrodes 220 and/or at least one of the remaining components of the keyboard 108 and/or touch input device such as touch surface 112. In such embodiments, the outer surface 120 may comprise a protective layer of the keyboard 108 and/or touch input device having a relatively low dielectric. As noted above, such a relatively low dielectric constant may be less than approximately 5. For example, the outer surface 120 may comprise a substantially transparent and/or relatively thin polymer, plastic, and/or other like material configured to prevent electrostatic field shunting during contact between the outer surface 120 and a conductor. For example, the thickness, composition, dielectric constant, and/or other characteristics of the outer surface 120 may be selected so as to minimize and/or substantially eliminate shunting of the electrostatic field created by one or more of the electrodes 206, 212, 220 when a finger of the user's hand 122 contacts the surface 120. By substantially eliminating shunting of the electrostatic field in this way, the outer surface 120 and/or other components of the keyboard 108 and/or touch input device may assist in distinguishing between inadvertent touch contact and intentional input by the user. For example, minimizing such shunting of the electrostatic field may enable the various electrodes 206, 212, 220 to determine a relatively large change in capacitance between inadvertent contact by the user's hand 122 and intentional contact by the user's finger. In some embodiments, a capacitance ($C_{TXRX}$) between overlapping electrodes of the keyboard 108 and/or touch input device may be determined by the processor 104 and/or the classification module 116 in accordance with the following equation:

$$C_{TXRX} = \varepsilon_0 \varepsilon_r (A/d)$$

wherein,
$\varepsilon_0 = 8.854(10-12)$ F/m;
$\varepsilon_r =$ Dielectric Constant of Material (air=1);
A=Overlapping Area of Electrodes; and
d=Distance Between Electrodes in the Direction of the Y axis.

When a pressure (e.g. force) is applied to the outer surface 120 by the user's hand 122 or another implement, such as a conductor, the distance d between the first electrodes 206 and the second electrodes 212 may decrease due to keyboard deflection and/or compression of the dielectric material and/or air gap 210. According to the above equation, such a decrease in the distance d will result in a corresponding increase in the determined capacitance $C_{TXRX}$. For example, such contact, and the resulting decrease in the distance d may cause an increase in self-capacitance measured between the plurality of first electrodes 206 and the plurality of second electrodes 212. The electrodes 206, 212 may determine such an increase in self-capacitance, and the processor 104 may determine a relative pressure being applied to the keyboard 108 and/or touch input device based on the increase. It is understood that such capacitance and relative pressure determinations may be made, using the above equation, for both the RTR and TRT configurations of the keyboard 108 and/or the other touch input device such as the touch surface 112.

When the electrodes shown in FIGS. 2 and 3 are operable in the RTR configuration, the second electrodes 212 may be sequentially driven, such as in the order 212a, 212b, 212c, by voltage received from the power source 124. In this configuration, the first and third electrodes 206, 220 may substantially simultaneously scan the charged second electrode 212 to measure and/or otherwise determine the drive voltage. For example, pairs of the first and third electrodes 206, 220 may sequentially scan the charged second electrode 212 substantially simultaneously. Such sequential substantially simultaneous scanning may be done, in pairs, in the order 206a, 220a; 206b, 220b; 206c, 220c. In this way, in the RTR configuration the first and third electrodes 206, 220 may "share" the drive voltage directed to each charged second electrode 212 during the scanning cycle. Since the pluralities of first and third electrodes 206, 220 scan the second electrodes 212 substantially simultaneously in the RTR configuration, pressure and location information can be determined substantially simultaneously. However, since the drive voltage is being shared by first and third electrodes 206, 220, a conductor approaching the keyboard 108 and/or touch the touch input device may shunt the electrostatic field created by the electrodes 206, 212, 220 relatively easily. As a result, multiple or relatively high-pressure touches by a finger of the user's hand 122 may degrade the signal received by the first and third electrodes 206, 220 in some situations.

On the other hand, when the electrodes shown in FIGS. 2 and 3 are operable in the TRT configuration, the first and third electrodes 206, 220 may be individually driven with voltage received from the power source 124. As a result of this configuration, even if a portion of the electrostatic field created by the electrodes 206, 212, 220 is shunted by a conductor approaching and/or contacting the outer surface 120, the individually driven first and third electrodes 206, 220 may each independently provide a component electrical charge to the second electrodes 212. Accordingly, the TRT configuration eliminates the need to share the voltage provided by the power source 124 between two sets of receiver electrodes (first and third electrodes 206, 220). However, in the TRT configuration, the first and third electrodes 206, 220 may be sequentially driven by voltage received from the power source 124, and the plurality of third electrodes 220 may be sequentially driven before the plurality of first electrodes 206. For example, in the TRT configuration the plurality of third electrodes 220 may be provided with a drive voltage in the order 220a, 220b, 220c, and as each third electrode 220 is provided with the drive voltage, the plurality of second electrodes 212 may sequentially scan the plurality of third electrodes 220 in the order 212a, 212b, 212c. In this way, a first or "touch" map may be generated by the second and third electrodes 212, 220. Once the touch map is generated, the plurality of first electrodes 206 may be provided with a drive voltage in the order 206a, 206b, 206c, and as each first electrode 206 is provided with the drive voltage, the plurality of second electrodes 212 may sequentially scan the plurality of first electrodes 206 in the order 212a, 212b, 212c. As a result, a second or "pressure" map may be generated by the first and second electrodes 206, 212. Since in the TRT configuration the drive voltage provided to the transmitter electrodes 206, 220 is not shared, this configuration is typically characterized by relatively high signal strength. However, since the first and third electrodes 206, 220 are separately scanned (i.e., not substantially simultaneously), the TRT configuration is typically not capable of determining pressure and location information (i.e., pressure and touch maps) substantially simultaneously.

Figure 4:
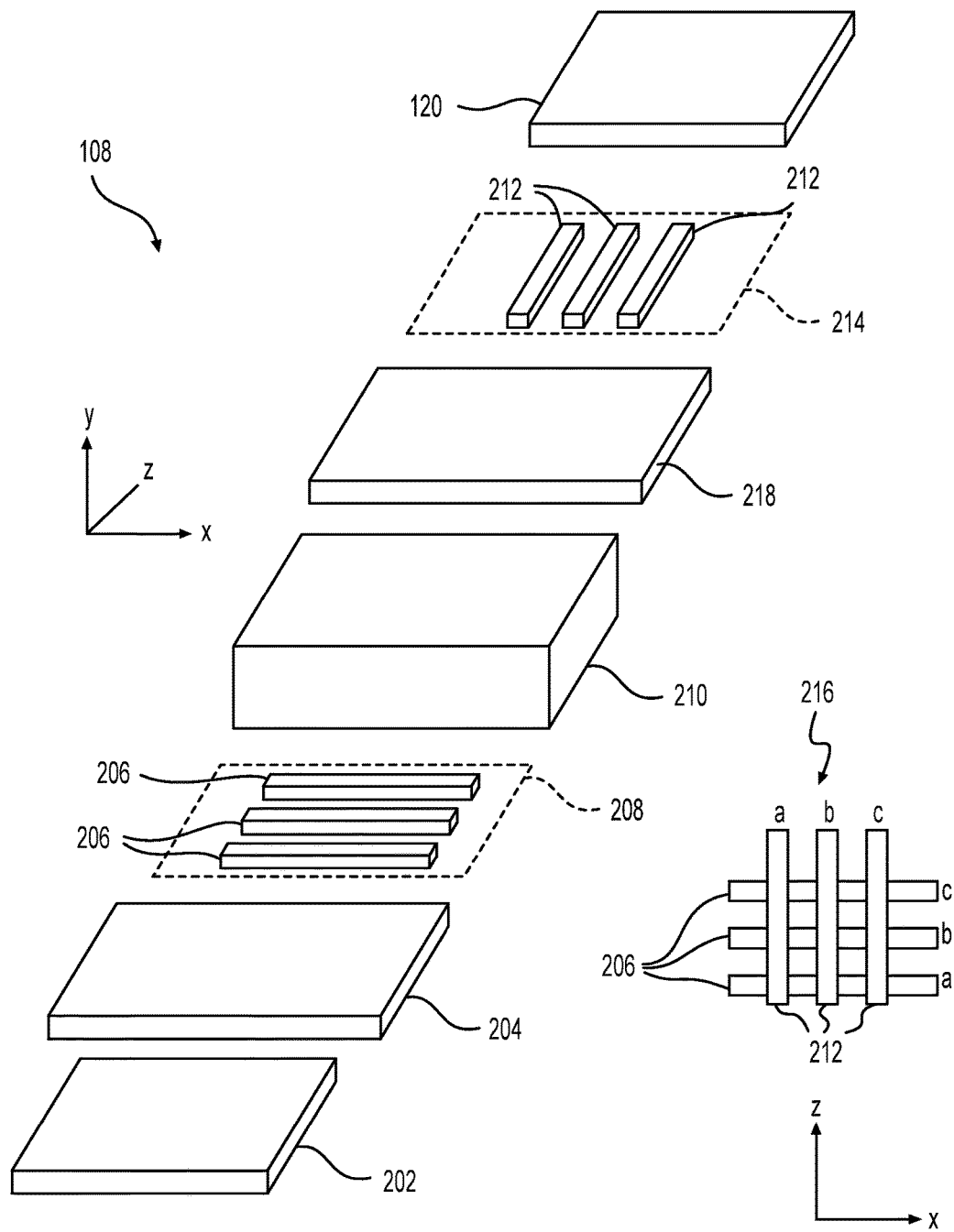
FIG. 4 illustrates another example of a structure of an associated computing device with a multi-touch capacitive sensing surface.
Figure 5:
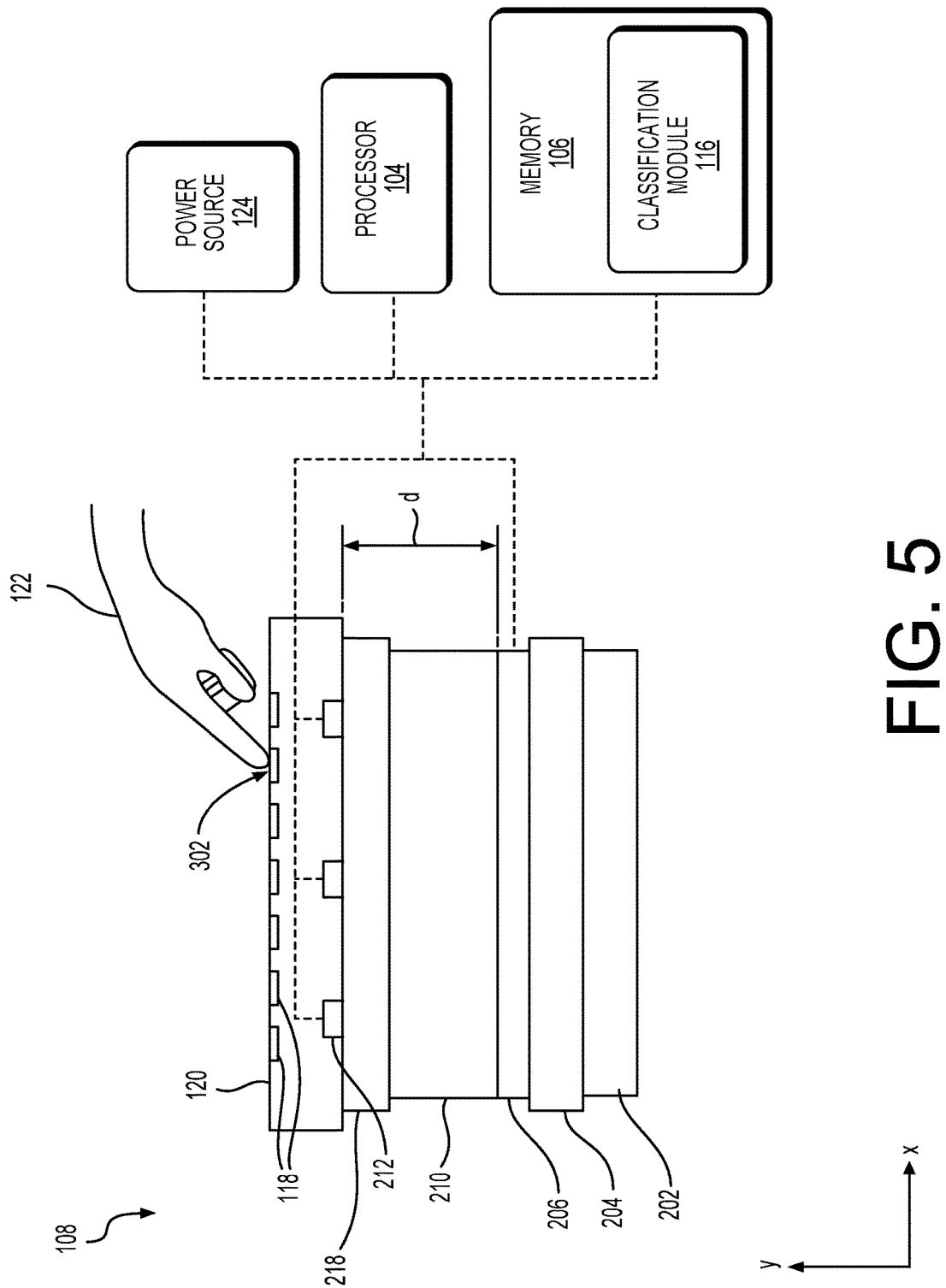
FIG. 5 is a further illustration of the structure shown in FIG. 4.

FIGS. 4 and 5 illustrate structural details of an additional embodiment of the keyboard 108. As noted above, the keyboard 108 is one example of an input device including a multi-touch capacitive sensing surface, and other touch input devices including a multi-touch capacitive sensing surface as described herein may include pressure sensitive touch input devices such as pressure sensitive touch surfaces 112, which can include touch pads and/or touch screens, etc. In particular, FIG. 4 illustrates an exploded view of the keyboard 108 and/or other touch input device such as touch surface 112 in which the third electrodes 220 have been omitted and in which the second electrodes 212 have been disposed on, embedded substantially within, and/or otherwise fixed to the second surface (i.e. top) of the printed circuit board 218. FIG. 5 illustrates a side view of the keyboard and/or other touch input device shown in FIG. 4. In the illustrated example, the components, materials, configurations, orientations, and/or other aspects of the keyboard 108 and/or other touch input device illustrated in FIGS. 4 and 5 are substantially identical to the corresponding aspects of the keyboard 108 and/or other touch input device illustrated in FIGS. 2 and 3, respectively. Accordingly, the description of the various keyboards 108 and/or other touch input device included herein applies to the embodiments shown in FIGS. 2-5 unless otherwise specified.

For example, in the embodiment shown in FIGS. 4 and 5, the first and second electrodes 206, 212 may comprise either a self-capacitance sensing system or a mutual-capacitance sensing system as described above. In a self-capacitance sensing system, for example, a capacitance of the first and/or second electrodes 206, 212 may be determined with reference to ground, and the ground shield 202 may be utilized for such a capacitance determinations. In such embodiments, at least one of the first and second electrodes 206, 212 may be configured to determine a pressure applied to the outer surface 120 by a finger of the user's hands 122, and the other of the first and second electrodes 206, 212 may be configured to determine the location 302 on the surface 120 at which the user's finger contacts the outer surface 120. Further, in such embodiments one of the first and second electrodes 206, 212 may be configured as transmitters while the other of the first and second electrodes 206, 212 may be configured as receivers.

On the other hand, in a mutual-capacitance sensing system, the capacitance between the spatially separated first and second electrodes 206, 212 may be determined at each intersecting node of the grid 402 shown in FIG. 4. Moreover, the dielectric material and/or air gap 210 spacing the first electrodes 206 from the second electrodes 212 may assist in reducing the mutual-capacitance determined at nodes positioned proximate the location 302 as, for example, the finger of the user's hand 122 approaches the location 302. Such a reduction in mutual-capacitance is illustrated by section A of the capacitance plot shown in FIG. 6. It is understood that this decrease in mutual-capacitance is characterized by a negative slope at section A of the capacitance plot.

Once a conductor, such as a finger of the user's hand 122 contacts the location 302, and the conductor begins to apply pressure to the outer surface 120, the mutual-capacitance determined at the nodes positioned proximate the location 302 may proportionately increase. Contact with the outer surface 120 by, for example, the user's finger is illustrated at section B in FIG. 6, and an increase in mutual-capacitance is illustrated by section C. For example, when the user's finger applies pressure to the outer surface 120, a mutual capacitance measurement between the first and second electrodes 206, 212 proximate location 302 may increase, while a mutual capacitance measurement between the electrodes 212, 218 proximate location 302 may decrease slightly. A maximum pressure applied to the outer surface 120 by the user's finger is illustrated at section D. It is understood that the increase in mutual-capacitance is characterized by a positive slope at section C of the capacitance plot. Once the user's finger begins to retract from the outer surface 120, the mutual-capacitance determined at the nodes proximate the location 302 may once again decrease until the finger is spaced from the outer surface 120 beyond the sensitivity range of the electrodes 206, 212. This decrease in mutual-capacitance is illustrated by section E in FIG. 6.

Accordingly, in some embodiments the mutual-capacitance measurements determined by the first and second electrodes 206, 212 may be used to facilitate distinguishing between an inadvertent contact with the outer surface 120 and an intentional key press or other like input by the user. For example, there may be between approximately 2 percent and approximately 15 percent variance in the capacitance determined between the initial contact illustrated at section B and the maximum pressure illustrated at section D. Alternatively, in additional embodiments, there may be less than approximately 2 percent or greater than approximately 15 percent variance in the determined capacitance. Due to the relatively sizable difference between the mutual-capacitance determined when the finger of the user's hand 122 initially contacts the surface 120 (section B) and the mutual-capacitance determined when the finger applies a maximum pressure to the outer surface 120 (section D), the classification module 116 may be configured to compare such determinations to thresholds associated with inadvertent contact an intentional key presses. In such embodiments, the classification module 116 may be configured to classify such contact as either inadvertent or intentional based on such comparisons.

Figure 6:
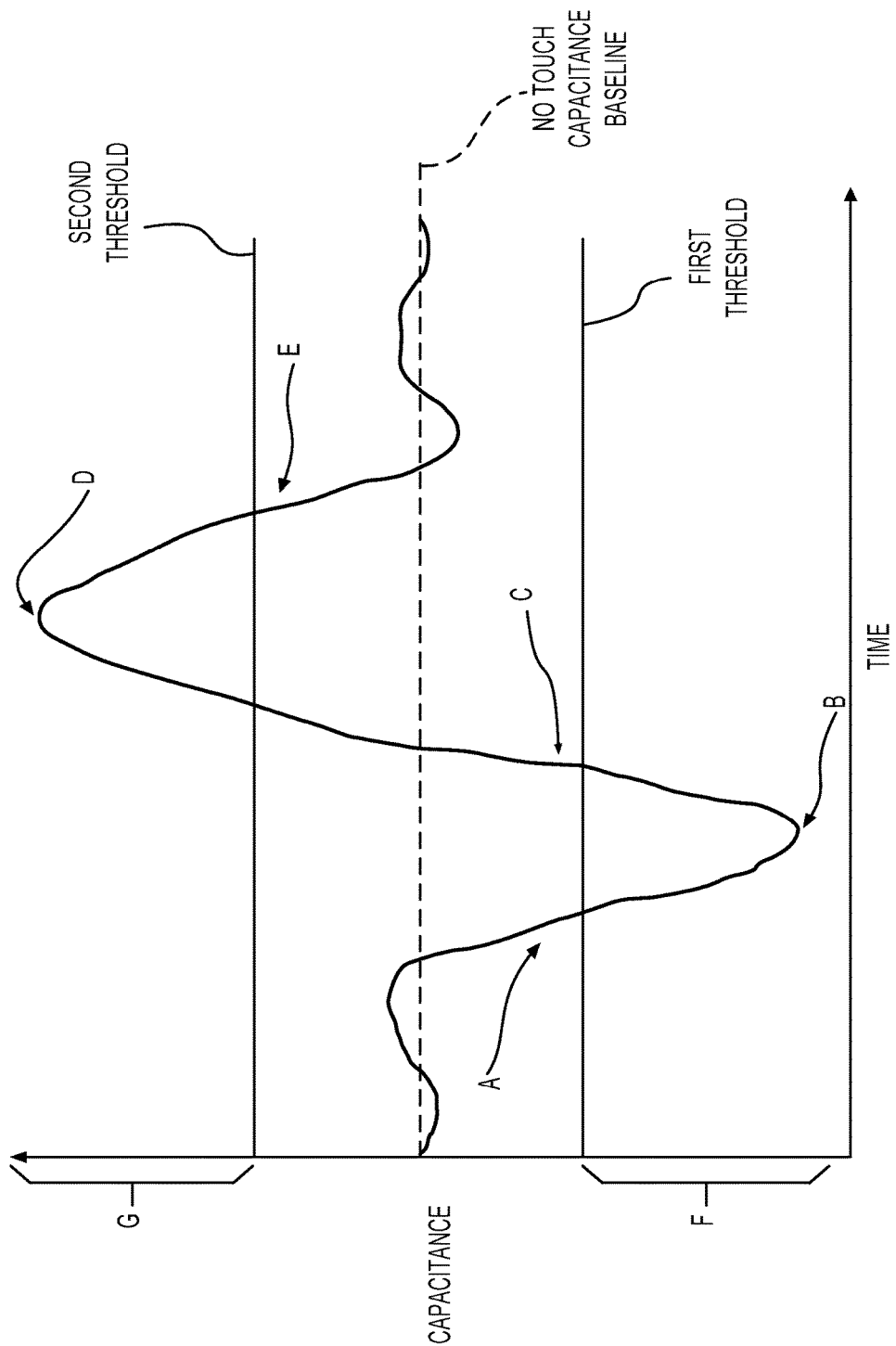
FIG. 6 is an example of a capacitance plot associated with a keyboard having a multi-touch capacitive sensing surface.

For example, FIG. 6 illustrates a first threshold associated with a capacitance of an inadvertent contact and a second threshold associated with a capacitance of an intentional key press. In some embodiments, if the first and second electrodes 206, 212 determine a mutual-capacitance that decreases to a value in section F below the first threshold, the classification module 116 may classify such contact as being inadvertent. However if the first and second electrodes 206, 212 determine a mutual-capacitance that increases to a value in section G above the second threshold, the classification module 116 may classify such contact is being an intentional key press by the user.

FIG. 6 also illustrates a "No Touch" capacitance baseline representative of the capacitance determined by the electrodes 206, 212, 220 when the conductor is outside of the sensing range described above. In some embodiments, if a difference between the No Touch baseline and a measured capacitance is greater than a predetermined threshold, such as the first threshold illustrated in FIG. 6, the contact between the outer surface 120 and the conductor may be classified as inadvertent. If, on the other hand, a difference between the No Touch baseline and a measured capacitance is less than a predetermined threshold, such as the second threshold illustrated in FIG. 6, the contact between the outer surface 120 and the conductor may be classified as an intentional key press by the user. For example, as will be described below with respect to FIG. 7, some processes of the present disclosure may include determining a baseline capacitance map, determining measured capacitances associated with a conductor approaching and/or contacting the outer surface 120 of the keyboard 108, and determining one or more differences between the baseline capacitance map and the measured capacitances. Contact with the outer surface 120 can be characterized based on such capacitance differences (i.e., deltas), and such processes may be utilized with any of the embodiments described herein with regard to FIGS. 2-5.

Example Processes

Figure 7:
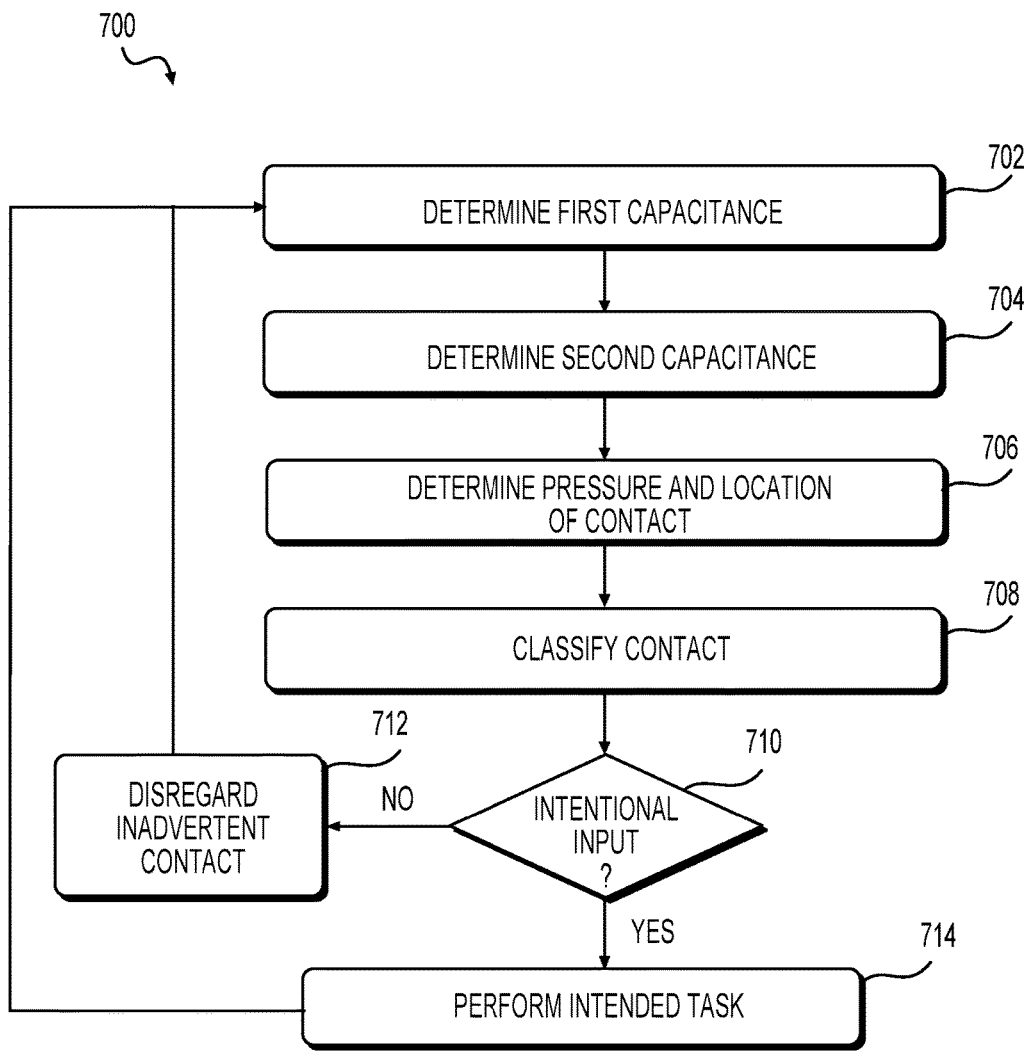
FIG. 7 is a flow diagram of an illustrative process for receiving user input and characterizing the user input.

FIG. 7 illustrates a process 700 as a collection of blocks in a logical flow diagram. The process 700 represents a sequence of operations that can be implemented in hardware, software, or a combination thereof. In the context of software, the blocks shown in FIG. 7 represent computer-executable instructions that, when executed by one or more processors, such as the processor 104, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. For discussion purposes, the process 700 is described with reference to the architecture 100 of FIG. 1, and the keyboard 108 of FIGS. 1-3. Nevertheless, it is understood that the process 700 shown in FIG. 7 is equally applicable to the embodiment of the keyboard 108 shown in FIGS. 4 and 5.

At 702, one or more of the electrodes 206, 212, 220 may determine a first capacitance associated with the keyboard 108. For example, at 702, one or more of the electrodes 206, 212, 220 may determine a series of first capacitances, and such first capacitances may comprise a baseline map associated with the keyboard 108. A baseline map is graphically illustrated by the No Touch capacitance baseline discussed above with respect to FIG. 6.

In embodiments in which the electrodes 206, 212, 220 are operable in the RTR configuration, the processor 104 may determine the first capacitance (i.e., the baseline map) at 702 by sequentially directing a drive voltage to each of the second electrodes 212, such as in the order 212*a*, 212*b*, 212*c*. In this configuration, when a drive voltage is directed to electrode 212*a*, pairs of first and third electrodes 206, 220 may substantially simultaneously scan the charged second electrode 212*a* to measure and/or otherwise determine the drive voltage. Such scanning may be performed by the pairs of the first and third electrodes 206, 220 sequentially, such as in the order 206*a*, 220*a*; 206*b*, 220*b*; 206*c*, 220*c*. Such capacitance measurements may be determined at 702 when no conductor is within a sensing range of the electrodes 206, 212, 220, and in this way, a capacitance baseline map may be generated at 702. It is understood that such a baseline map may be generated during power-up of the keyboard 108 or, alternatively, at any other time during use. The baseline map generated at 702 may be stored in the memory 106 for later use.

Alternatively, in embodiments in which the electrodes 206, 212, 220 are operable in the TRT configuration, the processor 104 may determine a pair of baseline maps at 702 by sequentially directing a drive voltage to the first and third electrodes 206, 220, and sequentially scanning each charged electrode with the plurality of second electrodes 212. For example, in the TRT configuration the plurality of third electrodes 220 may be provided with a drive voltage in the order 220*a*, 220*b*, 220*c*. In this configuration, when the drive voltage is provided to the third electrode 220*a*, the second electrodes 212 may sequentially scan the charged third electrode 220*a* to measure and/or otherwise determine the drive voltage in the order 212*a*, 212*b*, 212*c*. A drive voltage may then be provided to the third electrode 220*b*, and again, the second electrodes 212 may sequentially scan the charged third electrode 220*b* to determine the drive voltage. This process may continue at 702 until each of the third electrodes 220 has been driven and scanned, and as a result of these determinations, the processor 104 may generate a touch baseline map. The touch baseline map may be stored in the memory 106 for later use.

Once the touch baseline map has been generated and stored at 702, the first electrodes may be driven and scanned according to an identical protocol. As a result, a pressure baseline map may be generated at 702, and the pressure baseline map may be stored in the memory 106 for later use. Moreover, the touch and pressure baseline maps may be generated at power-up of the keyboard 108 or at any time during use.

At 704, one or more of the electrodes 206, 212, 220 may determine a second capacitance associated with the keyboard 108. For example, at 704, one or more of the electrodes 206, 212, 220 may determine a series of second capacitances, and such second capacitances may comprise a grid scan associated with normal use of the keyboard 108. For example, during use, the electrodes 206, 212, 220 may make a series of sequential capacitance determinations associated with movement of a conductor, such as a user's hand 122, relative to and/or in contact with the outer surface 120. Collectively, such determinations are represented as a second capacitance at 704. In some embodiments, the second capacitance determinations made at 704 may vary based on the configuration of the electrodes 206, 212, 220. For example, as discussed above with respect to 702, the protocol for determining the second capacitance at 704 may be different depending on whether the electrodes 206, 212, 220 are operable in the RTR configuration or the TRT configuration.

In embodiments in which the electrodes 206, 212, 220 are operable in the RTR configuration, at 704 the second electrodes 212 may be sequentially provided with a drive voltage as described above with respect to 702. The pairs of the first and third electrodes 206, 220 may then sequentially scan each charged second electrode 212, substantially simultaneously, in the order 206a, 220a; 206b, 220b; 206c, 220c. The processor 104 may process the capacitance values determined at 704 and may store these values in the memory 106. As a conductor approaches the outer surface 120 of the keyboard 108 at 704, the conductor may begin to shunt a portion of the electrostatic field created by the electrodes 206, 212, 220, thereby causing a variation in the second capacitance values determined at 704. In particular, as the conductor approaches the outer surface 120, the second and third electrodes 212, 220 may determine a reduction in mutual-capacitance. The mutual-capacitance determined by the second and third electrodes 212, 220 as the conductor initially contacts the outer surface 120 may be utilized by the processor 104 to determine the location 302 of contact.

Likewise, at 704 the first and second electrodes 206, 212 may determine an increase in self-capacitance as the conductor (e.g., a finger of the user's hand 122) applies pressure to the outer surface 120. In particular, the distance d between the first electrodes 206 and the second electrodes 212 may decrease as pressure is applied to the outer surface 120 by the user's finger. Such a decrease in the distance d may be facilitated by the use of the flexible dielectric material and/or air gap 210 spacing the first electrodes 206 from the second electrodes 212. In particular, such a flexible dielectric material and/or air gap may be compressed as a finger of the user's hand 122 applies pressure to the outer surface 120 at the location 302. The self-capacitance determined by the first and second electrodes 206, 212 as the user's finger applies a maximum pressure to the outer surface 120 may be utilized by the processor 104 to determine a pressure associated with the contact. The processor 104 may direct the information determined by the electrodes 206, 212, 220 to the memory 106 for later use.

In embodiments in which the electrodes 206, 212, 220 are operable in the TRT configuration, at 704 the plurality of third electrodes 220 and the plurality of first electrodes 206 may be provided with a drive voltage sequentially as described above with respect to 702. Additionally, the second electrodes 212 may sequentially scan each of the charged third and first electrodes 220, 206 to measure and/or otherwise determine the respective drive voltage. The processor 104 may process the capacitance values determined at 704 and may store these values in the memory 106. As a conductor approaches the outer surface 120 of the keyboard 108 at 704, the conductor may begin to shunt a portion of the electrostatic field created by the electrodes 206, 212, 220, thereby causing a variation in the second capacitance values determined by the first and third electrodes 206, 220 at 704. In particular, as the conductor approaches the outer surface 120, the second and third electrodes 212, 220 may determine a reduction in mutual-capacitance. The mutual-capacitance determined by the second and third electrodes 212, 220 as the conductor initially contacts the outer surface 120 may be utilized by the processor 104 to determine the location 302 of contact.

Likewise, at 704 the first and second electrodes 206, 212 may determine an increase in self-capacitance as the conductor applies pressure to the outer surface 120, thereby causing a decrease in the distance d between the first electrodes 206 and the second electrodes 212. The self-capacitance determined by the first and second electrodes 206, 212 as the user's finger applies a maximum pressure to the outer surface 120 may be utilized by the processor 104 to determine a pressure associated with the contact. The processor 104 may direct the information determined by the electrodes 206, 212, 220 to the memory 106 for later use. It is understood that the reduction in mutual-capacitance and increase in self-capacitance experienced at 704 may be similar regardless of whether the TRT or RTR configuration is employed.

At 706, the processor 104 may determine a pressure applied to the outer surface 120 by the user's finger based on the information received from the electrodes 206, 212, 220 at 702 and 704. At 706, the processor 104 may also determine the location 302 on the outer surface 120 at which the user's finger is contacting the outer surface 120 based on the information received at 702 and 704. For example, the processor 104 may enter such information into one or more algorithms, lookup tables, data maps, and/or other components stored in the memory 106. Such means may output pressure and/or location information that may be utilized by the processor 104 in determining whether or not to perform an intended task associated with the detected contact. For example, in embodiments in which the electrodes 206, 212, 220 are operable in the RTR configuration, the processor 104 may determine a difference (i.e., a delta) between the baseline map determined at 702 and the various capacitance values determined at 704. The processor 104 may determine one or more "location" deltas between the baseline map and the values indicative of the measured reduction in mutual-capacitance caused by the user's finger approaching the outer surface 120. At 706, the processor 104 may also determine one or more "pressure" deltas between the baseline map and the values indicative of the measured increase in self-capacitance as the user's finger applied pressure to the outer surface 120. For example, maximum touch deltas may be determined between the baseline map and the self-capacitance values at instances in which the user's finger initially contacted the outer surface 120, and maximum pressure deltas may be determined between the baseline map and the self-capacitance values at instances in which the user's finger applied a maximum pressure to the outer surface 120, such as during a key press.

In embodiments in which the electrodes 206, 212, 220 are operable in the TRT configuration, at 706 the processor 104 may determine one or more location deltas between the touch baseline map determined at 702 and the values indicative of the measured reduction in mutual-capacitance caused by the user's finger approaching the outer surface 120. At 706, the processor 104 may also determine one or more pressure deltas between the pressure baseline map determined at 702 and the values indicative of the measured increase in self-capacitance as the user's finger applied pressure to the outer surface 120.

At 708, the processor 104 may utilize the information measured, calculated, and/or otherwise determined at one or more of 702-706 to distinguish and/or otherwise classify the contact between the conductor and the keyboard 108 as either inadvertent contact or an intentional key press by the user. For example, at 708 the processor 104 may utilize some or all of the information described above with respect to 702-706 as inputs for the classification module 116. For example, at 708, the classification module 116 may compare one or more of the location deltas determined at 706 with a location delta threshold. If the one or more location deltas exceeds such a location delta threshold, the classification module 116 may then determine whether the one or more pressure deltas determined at 706 exceeds a predetermined pressure delta threshold.

If both the pressure and location deltas are satisfactorily exceeded, the processor 104 may then determine, at 708, whether the location 302 on the outer surface 120 contacted by the user's hand 122 substantially corresponds to a key 118 of the keyboard 108. Such a substantial correspondence between the location 302 and the key 118 may be satisfied if, for example, the location 302 substantially overlaps with and/or is within an outer border of the key 118 as defined by at least a portion of the outer surface 120. Accordingly, if the one or more location deltas exceeds the location delta threshold, the one or more pressure deltas exceeds the pressure threshold, and the location 302 on the surface 120 contacted by the user's hand 122 substantially corresponds to a key 118 of the keyboard 108, the classification module 116 may, at 708, classify the contact in question as being associated with an intentional key press.

On the other hand, if the location delta is less than the location delta threshold, the pressure delta is less than the pressure delta threshold, or the location 302 on the surface 120 contacted by the user's hand 122 does not substantially correspond to a particular key 118 of the keyboard 108, the classification module 116 may, at 708, classify the first and second capacitances as being associated with an inadvertent contact of the outer surface 120.

At 710, the processor 104 may determine, based on the one or more classifications at 708, whether the contact in question should be interpreted as an intentional input, e.g., key press. If the processor 104 determines, at 710, that such contact should not be interpreted as an intentional input, the processor 104 may, at 712, disregard the contact as inadvertent, and control may proceed to 702. If, on the other hand, the processor 104 determines, at 710, that such contact should be interpreted as an intentional input, the processor 104 may, at 714, proceed with performing an intended task corresponding to such contact. For example, at 714, the contact may be translated to a gesture (e.g., type a particular letter/number associated with the key 118, zoom in/out, pan, impart bold font on character, etc.) by the processor 104. Such contact may also be translated to other non-text-based output, such as editing actions (e.g., deletions, etc.), insertion point navigation, application control, or any suitable input or keyboard function.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system, comprising:
    a processor;
    a computer readable media operably connected to the processor; and
    a touch-sensitive input device operably connected to one or more of the processor and the computer readable media, the touch-sensitive input device including:
        a surface;
        a plurality of keys configured to enable user input via the touch-sensitive input device;
        a first plurality of substantially parallel electrodes disposed in a first plane;
        a second plurality of substantially parallel electrodes disposed in a second plane substantially parallel to the first plane in which an electrode of the second plurality of electrodes extends substantially perpendicular to an electrode of the first plurality of electrodes;
        a third plurality of substantially parallel electrodes disposed in a third plane substantially parallel to the first plane and the second plane, in which an electrode of the third plurality of electrodes extends substantially parallel to the electrode of the first plurality of electrodes; and
        at least one of a flexible dielectric material or an air gap spacing the first plurality of electrodes from the second plurality of electrodes, wherein:
        the first plurality of electrodes and the second plurality of electrodes are configured to determine a first capacitance associated with a conductor contacting the surface, wherein the first capacitance indicates a pressure of the conductor contacting the surface; and
        the second plurality of electrodes and the third plurality of electrodes are configured to determine a second capacitance substantially simultaneously with the first capacitance, wherein the second capacitance indicates a location on the surface of the input device at which the conductor contacts the surface relative to the keys of the input device;
        one of the first capacitance or the second capacitance being determined based at least in part on a self-capacitance measurement, and the other of the first capacitance and the second capacitance being determined based at least in part on a mutual-capacitance measurement; and
        the processor configured to classify the contact between the conductor and the surface as being one of an inadvertent contact or an intentional key press based, at least in part, on the first capacitance, the second capacitance, a pressure threshold value associated with an inadvertent contact measured using the first capacitance and a location threshold value associated with known input mechanisms measured using the second capacitance.

2. The system of claim 1, wherein the first capacitance is determined based, at least in part, on the self-capacitance measurement and the second capacitance is determined based at least in part on the mutual-capacitance measurement.

3. The system of claim 1, wherein the second and third pluralities of electrodes are configured to determine a decrease in mutual-capacitance associated with the conductor approaching the surface, and wherein the first and second pluralities of electrodes are configured to determine an increase in self-capacitance associated with the conductor applying pressure to the surface.

4. The system of claim 1, wherein in the touch-sensitive input device is implemented as a keyboard that is external to an associated computing device.

5. The system of claim 1, wherein the known input mechanisms are keys of a keyboard.

6. A touch-sensitive input device, comprising:
a first electrode disposed in a first plane;
a second electrode disposed in a second plane substantially parallel to the first plane, the second electrode extending substantially perpendicular to the first electrode;
at least one of a flexible dielectric material or an air gap spacing the first electrode from the second electrode, the first electrode and the second electrode configured to determine a first capacitance associated with a conductor contacting a surface of the touch-sensitive input device; and
a third electrode disposed in a third plane substantially parallel to the first plane, the third electrode extending substantially parallel to the first electrode and being spaced from the first electrode by the at least one of the flexible dielectric material or the air gap, the second electrode and the third electrode configured to determine a second capacitance substantially simultaneously with the first capacitance, wherein:
one of the first capacitance or the second capacitance is determinable based, at least in part, on a self-capacitance measurement;
the other of the first capacitance and the second capacitance is determinable based, at least in part, on a mutual-capacitance measurement; and
the contact between the conductor and the surface of the touch-sensitive input device is classifiable as one of an inadvertent contact or an intentional contact based, at least in part, on the first capacitance, the second capacitance, a pressure threshold value associated with an inadvertent contact measured using one of the first capacitance and the second capacitance and a location threshold value associated with known input mechanisms measured using the other of the first capacitance and the second capacitance.

7. The system of claim 6, further comprising a flexible printed circuit board spaced from the first electrode by the at least one of the dielectric material or the air gap, the second electrode being fixed to the printed circuit board.

8. The system of claim 6, wherein the second electrode is disposed between the first electrode and the third electrode.

9. The system of claim 6, wherein the first electrode is one of a first plurality of substantially parallel electrodes disposed in the first plane, the second electrode is one of a second plurality of substantially parallel electrodes disposed in the second plane, and the third electrode is one of a third plurality of substantially parallel electrodes disposed in the third plane.

10. The system of claim 6, wherein the at least one of the dielectric material or the air gap is disposed between the first plane and the third plane.

11. The system of claim 6, wherein the first electrode and the third electrode both comprise one of a capacitive receiver or a capacitive transmitter, and wherein the second electrode comprises the other of the capacitive receiver or the capacitive transmitter.

12. The system of claim 6, wherein the first electrode and the second electrode are configured to determine a first characteristic associated with the conductor contacting the surface of the touch-sensitive input device based at least in part on the self-capacitance measurement, and the second and the third electrodes are configured to determine a second characteristic associated with the conductor contacting the surface of the touch-sensitive input device based at least in part on the mutual-capacitance measurement.

13. The system of claim 12, wherein the first characteristic comprises the pressure applied to the surface of the touch-sensitive input device by the conductor and the second characteristic comprises the location on the surface of the touch-sensitive input device at which the conductor contacts the surface of the touch-sensitive input device.

14. The system of claim 12, wherein one of the first, second, and third electrodes are configured to determine the first and second characteristics substantially simultaneously.

15. The system of claim 6, wherein the touch-sensitive input device is a keyboard.

16. A method, comprising:
determining a first capacitance associated with a conductor contacting a surface of a touch-sensitive input device, the touch-sensitive input device being external to an associated computing device, the first capacitance being determined by a first electrode disposed in a first plane and a second electrode disposed in a second plane substantially parallel to the first plane, the first electrode extending substantially perpendicular to the second electrode and being spaced from the second electrode by at least one of a flexible dielectric material or an air gap;
determining a second capacitance associated with the conductor contacting the surface of the touch-sensitive input device, the second capacitance being determined by the second electrode and a third electrode disposed in a third plane substantially parallel to the first plane, the third electrode extending substantially parallel to the first electrode and being spaced from the first electrode by the at least one of the flexible dielectric material or the air gap;
determining one of the first capacitance or the second capacitance based at least in part on a self-capacitance measurement;
determining the other of the first capacitance and the second capacitance based at least in part on a mutual-capacitance measurement;
directing information indicative of the first capacitance and the second capacitance from the input device to a processor operably connected to the input device;
determining, with the processor, a pressure applied to the surface of the touch-sensitive input device by the conductor based on the information indicative of the first capacitance;
determining a location on the surface of the touch-sensitive input device based on the information indicative of the second capacitance substantially simultaneously with the first capacitance;
determining a first difference between the first capacitance and a respective baseline and a second difference between the second capacitance and the respective baseline; and
classifying contact between the conductor and the surface of the touch-sensitive input device as being one of an inadvertent contact or an intentional contact based at least in part on the first difference, the second difference, and a location difference threshold value associated with known input mechanisms.

17. The method of claim 16, further comprising determining, with the second and third electrodes, a decrease in mutual-capacitance associated with the conductor approaching the surface of the touch-sensitive input device.

18. The method of claim 16, further comprising determining, with the first and second electrodes, an increase in self-capacitance associated with the conductor applying pressure to the surface of the touch-sensitive input device.

19. The method of claim 16, wherein the first capacitance is determined based at least in part on the self-capacitance measurement and the second capacitance is determined based at least in part on the mutual-capacitance measurement.

20. The method of claim 16, wherein the first electrode and the third electrode both comprise one of a capacitive receiver or a capacitive transmitter, and wherein the second electrode comprises the other of the capacitive receiver or the capacitive transmitter.

* * * * *